Nov. 2, 1965      F. E. JARECKI      3,215,377
COMBINATION AIRCRAFT AND RAIN, SNOW, AND ICE DEFLECTOR
Filed Oct. 1, 1963
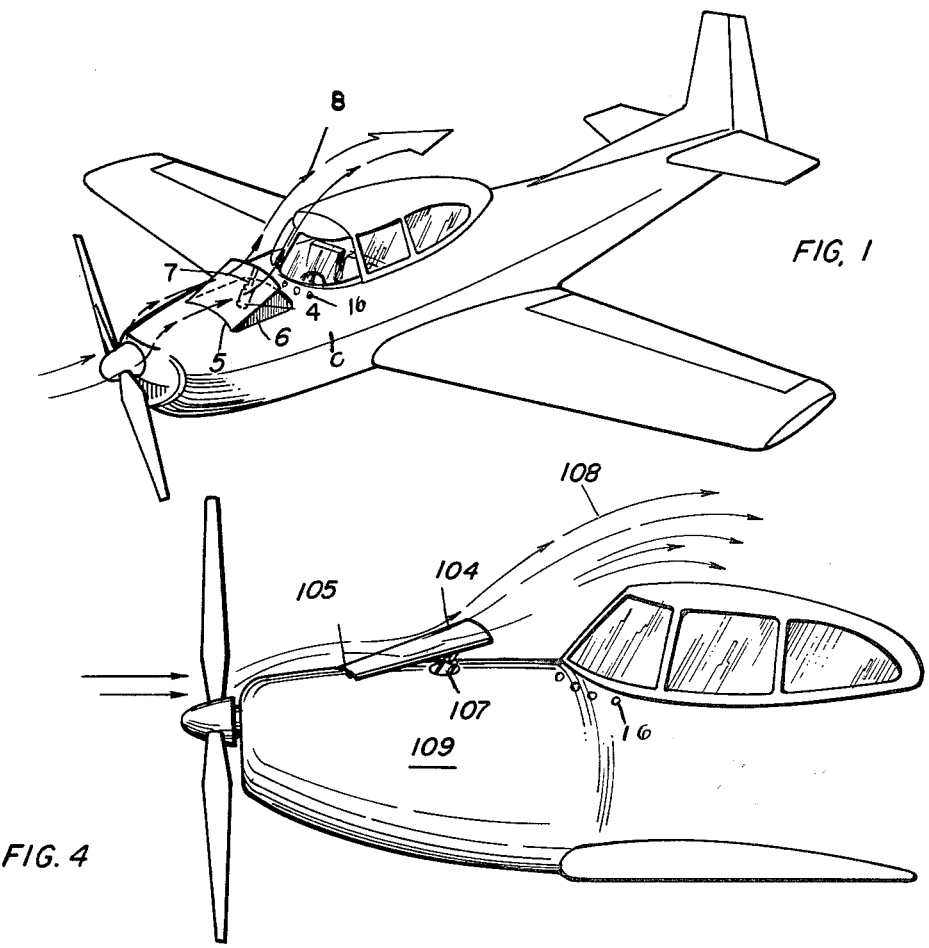
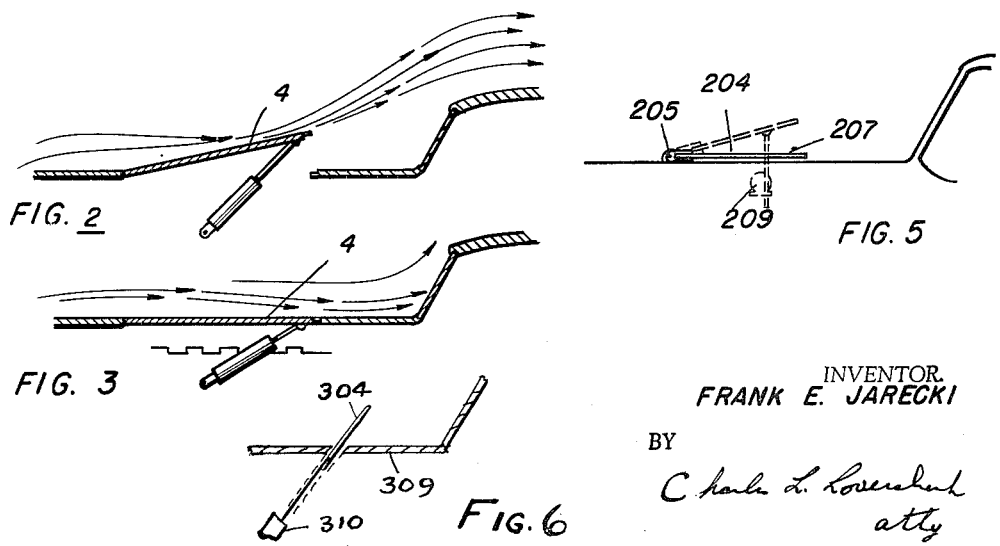
INVENTOR.
FRANK E. JARECKI
BY United States Patent Office 3,215,377
Patented Nov. 2, 1965

3,215,377
COMBINATION AIRCRAFT AND RAIN, SNOW, AND ICE DEFLECTOR
Frank E. Jarecki, Reno, Pa.
Filed Oct. 1, 1963, Ser. No. 312,954
1 Claim. (Cl. 244—134)

This invention relates to windshield deflectors and, more particularly, to a windshield deflector in combination with an aircraft.

Windshield deflectors for deflecting bugs, insects, snow, air currents, and other foreign objects upwardly from a windshield so as not to obscure the vision of the operator while driving have been used on automobiles; however, windshield deflectors have never, to the knowledge of the inventor, been used in combination with aircraft.

The problem of rain, snow, and ice accumulating on the windshield of aircraft is pronounced, particularly because many aircraft do not have windshield wipers. The high velocity of the air stream over the windshield is relied upon to keep the windshield clean; however, during heavy rain, the air stream is not sufficient to keep the windshield clean and heavy accumulations of ice or snow often collect which are troublesome, especially during landing of the aircraft.

Therefore, it has been conceived that because of the high speed of flight of the aircraft, a small deflector on the cowling in front of the windshield will prevent rain itself from accumulating on the windshield, particularly since an aircraft usually travels at upwards of one hundred miles an hour. The deflector can be retractable when not in use to reduce drag to a minimum.

It is, accordingly, an object of the present invention to provide a novel combination of an aircraft and a draft deflector.

Another object of the invention is to provide, in combination, a deflector for rain and snow with an aircraft.

Still another object of the invention is to provide an improved draft deflector.

A further object of this invention is to provide a deflector which is retractable.

Yet a further object of the invention is to provide a deflector which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIGS. 1, 2, and 3 are views of draft deflectors according to the invention shown on an aircraft;

FIGS. 4 and 5 are views of other embodiments of the invention; and

FIG. 6 is a cross sectional view of another embodiment of the invention.

Now with more particular reference to the drawing wherein for purposes of illustration is shown a preferred embodiment of the invention, numeral 4 generally designates a deflector for disposition on a cowling C of an aircraft shown in FIG. 1. The deflector 4 is constructed from a strip of sheet metal, plastic, or the like and may be finished with a pleasing finish or it may be highly polished to present a smooth surface for deflecting rain or snow. The deflector 4 may be slightly curved in cross section with a top thereof bent forward a slight degree. This enables the air currents to carry the snow and rain above the windshield of the aircraft, thereby keeping it clean.

The draft deflector is hinged at 5 to the cowling and, when not in use, it may be lowered into a recess 6 by means of a hydraulic cylinder 7 or other suitable fastening member. The draft deflector 4, when raised to the inclined position shown in FIG. 1, will direct the air over top of the windshield along the arrows 8 so that the rain drops and snow particles will be deflected above the windshield.

The cowling may have holes 16 through which hot air, anti-icing fluid, or other medium can be forced which will land on the windshield and melt any ice which may form thereon.

The embodiment of the invention disclosed in FIG. 4 shows a draft deflector 104 hinged at 105 to the top of a cowling 109. The deflector is made generally in the shape of the cowling so that when it is lowered by means of a hydraulic cylinder 107, it will rest flush with the top of the cowling 109. The air will be deflected by the deflector in a path similar to the arrows 108.

In the embodiment of the invention shown in FIG. 5, a draft deflector 204 is hinged at 205 to the cowling. It may be in the form of a straight plate connected to a piston rod 207 which may have a suitable mechanical fastener 209 under the cowling. Thus, the deflector may be moved up to the phantom line position for operation and may be lowered to the full line position to reduce drag when not needed.

In the embodiment of the invention shown in FIG. 6, a cowling 309 of an aircraft is shown wherein a deflector is drawn into the slot in the cowling by a hydraulic cylinder 310.

The foregoing specification sets forth the invention in its preferred practical forms but the structure shown is capable of modification within a range of equivalents without departing from the invention which is to be understood is broadly novel as is commensurate with the appended claim.

I claim:

In combination, an aircraft having a windshield and a cowling directly ahead of said windshield,
    a draft deflector made of a plate like member slidably attached to said cowling,
    a slot in said cowling,
    and means to move said deflector in a plane generally parallel to said windshield from inside said aircraft through said slot into position to deflect rain and snow from said windshield when said aircraft is in flight.

References Cited by the Examiner
UNITED STATES PATENTS

| 2,164,531 | 7/39 | Lee | 244—42.6 |
| 2,823,072 | 2/58 | Podolan | 296—91 |
| 2,859,004 | 11/58 | Lopiccolo | 244—42.6 |
| 3,041,992 | 7/62 | Lee | 244—130 X |

FOREIGN PATENTS

| 357,736 | 8/22 | Germany. |
| 716,116 | 1/42 | Germany. |

FERGUS S. MIDDLETON, *Primary Examiner.*